(12) United States Patent
Kurihara et al.

(10) Patent No.: US 11,972,642 B2
(45) Date of Patent: Apr. 30, 2024

(54) ROTATING MACHINERY DIAGNOSIS AND MONITORING DEVICE AND METHOD

(71) Applicant: Mitsubishi Heavy Industries, Ltd., Tokyo (JP)

(72) Inventors: Tamami Kurihara, Tokyo (JP); Kengo Iwashige, Tokyo (JP); Tadaaki Kakimoto, Tokyo (JP); Tetsuji Morita, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 17/148,650

(22) Filed: Jan. 14, 2021

(65) Prior Publication Data

US 2021/0304521 A1 Sep. 30, 2021

(30) Foreign Application Priority Data

Mar. 25, 2020 (JP) ................. 2020-053906

(51) Int. Cl.
*G06F 11/30* (2006.01)
*G05B 23/02* (2006.01)
*G07C 3/00* (2006.01)

(52) U.S. Cl.
CPC ......... *G07C 3/005* (2013.01); *G05B 23/0275* (2013.01); *G05B 23/0283* (2013.01)

(58) Field of Classification Search
CPC . G07C 3/005; G05B 23/0275; G05B 23/0283
See application file for complete search history.

(56) References Cited

U.S. PATENT DOCUMENTS

| 4,352,293 A | * | 10/1982 | Kurihara | ................. | G01H 3/08 |
| | | | | | 702/56 |
| 4,437,163 A | * | 3/1984 | Kurihara | ................. | G07C 3/00 |
| | | | | | 702/56 |

(Continued)

FOREIGN PATENT DOCUMENTS

| CN | 104823035 A | 8/2015 |
| CN | 110234972 A | 9/2019 |

(Continued)

OTHER PUBLICATIONS

Lei, et al. "Modeling the relationship between vibration features and condition parameters using relevance vector machines for health monitoring of rolling element bearings under varying operation conditions." Mathematical Problems in Engineering 2015 (2015) (Year: 2015).*

(Continued)

*Primary Examiner* — Phuong Huynh
(74) *Attorney, Agent, or Firm* — Volpe Koenig

(57) ABSTRACT

The present invention provides a rotating machinery diagnosis and monitoring device and method which have high reliability and enable the grasping of a symptom trend of vibrations and a determination of progress of the vibrations during increase and decrease in the rotation speed of a rotor. A rotating machinery diagnosis and monitoring device of the present invention, comprising: an input section that receives vibration values and rotation speeds as operation data of a rotating machine; a computing section that performs computations using the operation data received; and a calculator that includes an output section. The computing section is configured to identify peak values of the vibration values and evaluate each of magnitude of the peak values and the rotation speeds at the peak values. The output section is (Continued)

configured to display externally a result of evaluations performed by the computing section.

7 Claims, 16 Drawing Sheets

(56) References Cited

U.S. PATENT DOCUMENTS

| | | | |
|---|---|---|---|
| 4,988,979 A | 1/1991 | Sasaki et al. | |
| 6,456,945 B1* | 9/2002 | Sonnichsen | G01M 13/028 702/56 |
| 2004/0176902 A1 | 9/2004 | McBrien et al. | |
| 2008/0234964 A1* | 9/2008 | Miyasaka | G01M 13/04 702/113 |
| 2011/0178772 A1 | 7/2011 | Gerez et al. | |
| 2013/0006551 A1* | 1/2013 | Sako | G01M 13/045 702/56 |
| 2017/0314539 A1* | 11/2017 | Kim | F03G 7/065 |
| 2019/0074896 A1* | 3/2019 | Murphy | G01D 5/353 |
| 2019/0101103 A1* | 4/2019 | Haseba | F03D 80/70 |
| 2019/0197917 A1 | 6/2019 | Endo et al. | |
| 2019/0310281 A1* | 10/2019 | Hayzen | G01H 1/003 |
| 2019/0384275 A1 | 12/2019 | Shida et al. | |
| 2020/0019150 A1 | 1/2020 | Shida et al. | |
| 2020/0025648 A1 | 1/2020 | Haseba | |

FOREIGN PATENT DOCUMENTS

| | | | |
|---|---|---|---|
| JP | 2004-169624 A | | 6/2004 |
| JP | 2007-010415 A | | 1/2007 |
| JP | 6474564 B2 | | 2/2019 |
| JP | 2019203788 A | * | 11/2019 |
| WO | 2010/040966 A1 | | 4/2010 |

OTHER PUBLICATIONS

Extended European Search Report dated Jun. 7, 2021 for European Patent Application No. 20215812.7.
Japanese Office Action dated May 30, 2023 for Japanese Patent Application No. 2020-053906.
Chinese Office Action dated Dec. 18, 2023 for Chinese Patent Application No. 202110086071.8.
Japanese Office Action dated Jan. 17, 2023 for Japanese Patent Application No. 2020-053906.

* cited by examiner

FIG. 8

DBB1U

| PEAK NAME (d1) | DATA AND TIME (d2) | ROTATION SPEED [min⁻¹] (d3) | SHAFT VIBRATION VALUE [μm] (d4) |
|---|---|---|---|
| PEAK UNDER SPEEDUP | yyyy-mm-dd hh:mm:ss | ssss | vv |
| PEAK UNDER SPEEDUP | yyyy-mm-dd hh:mm:ss | ssss | vv |
| PEAK UNDER SPEEDUP | yyyy-mm-dd hh:mm:ss | ssss | vv |
| | | | |
| | | | |
| | | | |
| | | | |
| | | | |
| | | | |
| | | | |

FIG. 9

DBB1D

| PEAK NAME (d1) | DATA AND TIME (d2) | ROTATION SPEED [min⁻¹] (d3) | SHAFT VIBRATION VALUE [μm] (d4) |
|---|---|---|---|
| PEAK UNDER SLOWDOWN | yyyy-mm-dd hh:mm:ss | ssss | vv |
| PEAK UNDER SLOWDOWN | yyyy-mm-dd hh:mm:ss | ssss | vv |
| PEAK UNDER SLOWDOWN | yyyy-mm-dd hh:mm:ss | ssss | vv |
| PEAK UNDER SLOWDOWN | yyyy-mm-dd hh:mm:ss | ssss | vv |
| | | | |
| | | | |
| | | | |
| | | | |
| | | | |
| | | | |

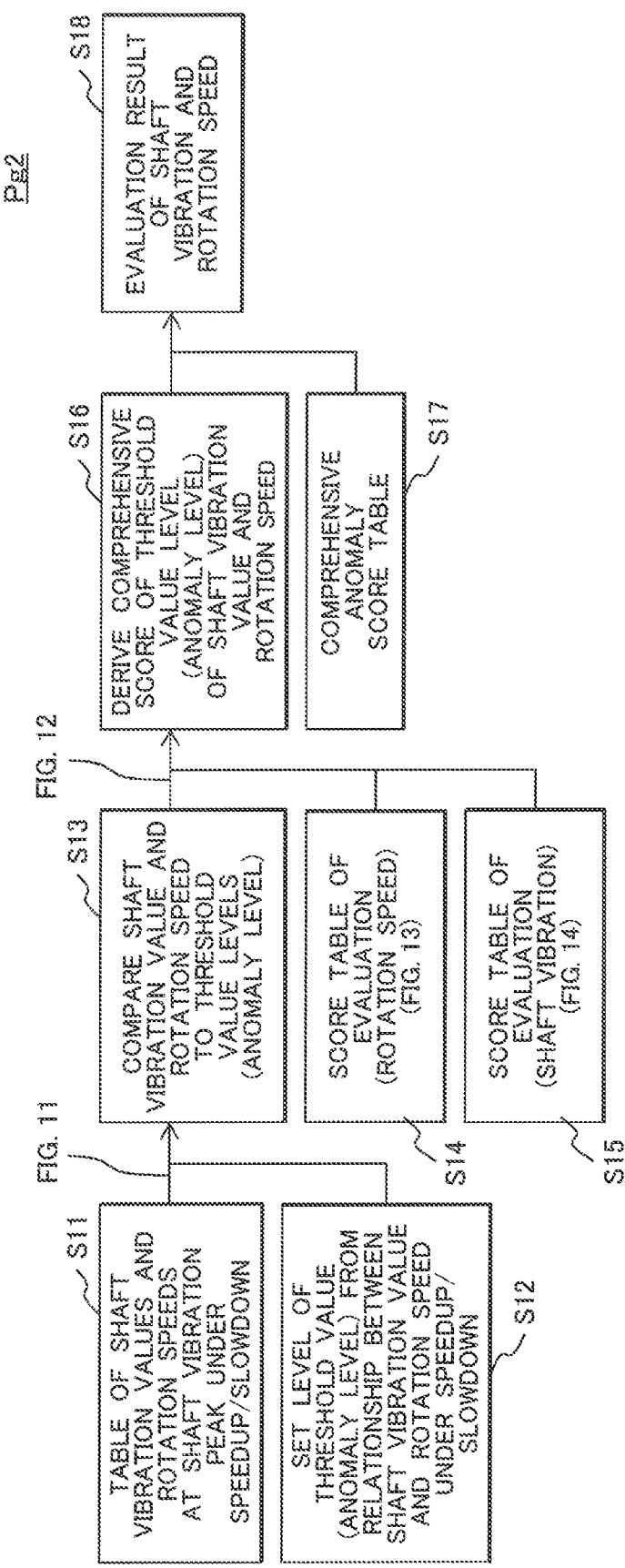

FIG. 12

| PEAK NAME | DATE AND TIME | ROTATION SPEED [min⁻¹] | THRESHOLD VALUE OF ROTATION SPEED | | SHAFT VIBRATION VALUE [μm] | SHAFT VIBRATION THRESHOLD VALUE | |
|---|---|---|---|---|---|---|---|
| | | | ≧ | ≦ | | ≧ | ≦ |
| PEAK UNDER SPEEDUP 1 | yyyy-mm-dd hh:mm:ss | ssss | FIRST LOWER LIMIT | FIRST UPPER LIMIT | vv | FIRST LOWER LIMIT | FIRST UPPER LIMIT |
| PEAK UNDER SPEEDUP 2 | yyyy-mm-dd hh:mm:ss | ssss | FIRST LOWER LIMIT | FIRST UPPER LIMIT | vv | FIRST LOWER LIMIT | FIRST UPPER LIMIT |
| PEAK UNDER SLOWDOWN 1 | yyyy-mm-dd hh:mm:ss | ssss | FIRST LOWER LIMIT | FIRST UPPER LIMIT | vv | FIRST LOWER LIMIT | FIRST UPPER LIMIT |
| PEAK UNDER SLOWDOWN 2 | yyyy-mm-dd hh:mm:ss | ssss | FIRST LOWER LIMIT | FIRST UPPER LIMIT | vv | FIRST LOWER LIMIT | FIRST UPPER LIMIT |
| ... | | | | | | | |
| PEAK UNDER SPEEDUP 3 | yyyy-mm-dd hh:mm:ss | ssss | FIFTH UPPER LIMIT | SIXTH UPPER LIMIT | vv | FOURTH UPPER LIMIT | |
| PEAK UNDER SLOWDOWN 3 | yyyy-mm-dd hh:mm:ss | ssss | FIFTH UPPER LIMIT | SIXTH UPPER LIMIT | vv | FOURTH UPPER LIMIT | |
| PEAK UNDER SLOWDOWN 4 | yyyy-mm-dd hh:mm:ss | ssss | FIFTH UPPER LIMIT | SIXTH UPPER LIMIT | vv | FOURTH UPPER LIMIT | |

FIG. 13

| | SECOND LOWER LIMIT | FIRST LOWER LIMIT | NORMALITY | FIRST UPPER LIMIT | SECOND UPPER LIMIT | THIRD UPPER LIMIT | FOURTH UPPER LIMIT | FIFTH UPPER LIMIT | SIXTH UPPER LIMIT |
|---|---|---|---|---|---|---|---|---|---|
| SCORE | ≦ 2 | ≦ 1 | 0 | ≦ 1 | ≦ 2 | ≦ 4 | ≦ 5 | ≦ 8 | ≦ 10 |
| PEAK UNDER SPEEDUP 1 | | | x | | | | | | |
| PEAK UNDER SPEEDUP 2 | | | x | | | | | | |
| PEAK UNDER SLOWDOWN 1 | | | | | | | | | |
| PEAK UNDER SLOWDOWN 2 | | | x | | | | | | |
| ... | | | | | | | | | |
| PEAK UNDER SPEEDUP 3 | | | | | | | | x | |
| PEAK UNDER SLOWDOWN 3 | | | | | | | | x | |
| PEAK UNDER SLOWDOWN 4 | | | | | | | | x | |

FIG. 14

| | SECOND LOWER LIMIT | FIRST LOWER LIMIT | NORMALITY | FIRST UPPER LIMIT | SECOND UPPER LIMIT | THIRD UPPER LIMIT | FOURTH UPPER LIMIT |
|---|---|---|---|---|---|---|---|
| | ≥ | ≥ | | ≥ | ≥ | ≥ | ≥ |
| SCORE | 3 | 2 | 0 | 2 | 5 | 8 | 10 |
| PEAK UNDER SPEEDUP 1 | | | × | | | | |
| PEAK UNDER SPEEDUP 2 | | | × | | | | |
| PEAK UNDER SLOWDOWN 1 | | | × | | | | |
| PEAK UNDER SLOWDOWN 2 | | | × | | | | |
| ... | | | | | | | |
| PEAK UNDER SPEEDUP 3 | | | | | | | × |
| PEAK UNDER SLOWDOWN 3 | | | | | | | × |
| PEAK UNDER SLOWDOWN 4 | | | | | | | × |

FIG. 15

| SHAFT VIBRATION \ ROTATION SPEED | SECOND LOWER LIMIT ≤3 | FIRST LOWER LIMIT ≤2 | NORMALITY 0 | FIRST UPPER LIMIT ≤2 | SECOND UPPER LIMIT ≤5 | THIRD UPPER LIMIT ≤8 | FOURTH UPPER LIMIT ≤10 |
|---|---|---|---|---|---|---|---|
| SECOND LOWER LIMIT ≤2 | | | | | | | |
| FIRST LOWER LIMIT ≤1 | | | | | | | |
| NORMALITY 0 | | | PEAK UNDER SPEEDUP 1<br>PEAK UNDER SPEEDUP 2<br>PEAK UNDER SLOWDOWN 1<br>PEAK UNDER SLOWDOWN 2 | | | | |
| FIRST UPPER LIMIT ≤1 | | | | | | | |
| SECOND UPPER LIMIT ≤2 | | | | | | | |
| THIRD UPPER LIMIT ≤4 | | | | | | | |
| FOURTH UPPER LIMIT ≤5 | | | | | | | |
| FIFTH UPPER LIMIT ≤8 | | | | | | | PEAK UNDER SPEEDUP 3<br>PEAK UNDER SLOWDOWN 3<br>PEAK UNDER SLOWDOWN 4 |
| SIXTH UPPER LIMIT ≤10 | | | | | | | |

FIG. 16

| ROTATION SPEED \ SHAFT VIBRATION | SECOND LOWER LIMIT ≦ | FIRST LOWER LIMIT ≦ | NORMALITY | FIRST UPPER LIMIT ≦ | SECOND UPPER LIMIT ≦ | THIRD UPPER LIMIT ≦ | FOURTH UPPER LIMIT ≦ |
|---|---|---|---|---|---|---|---|
| SECOND LOWER LIMIT ≦ | 3 | 2 | 0 | 2 | 5 | 8 | 10 |
| FIRST LOWER LIMIT ≦ | 5 | 4 | 2 | 4 | 7 | 10 | 12 |
| NORMALITY | 4 | 3 | 1 | 3 | 6 | 9 | 11 |
| FIRST UPPER LIMIT ≦ | 3 | 2 | 0 | 2 | 5 | 8 | 10 |
| SECOND UPPER LIMIT ≦ | 4 | 3 | 1 | 3 | 6 | 9 | 11 |
| THIRD UPPER LIMIT ≦ | 5 | 4 | 2 | 4 | 7 | 10 | 12 |
| FOURTH UPPER LIMIT ≦ | 7 | 6 | 4 | 6 | 9 | 12 | 14 |
| FIFTH UPPER LIMIT ≦ | 8 | 7 | 5 | 7 | 10 | 13 | 15 |
| SIXTH UPPER LIMIT ≦ | 11 | 10 | 8 | 10 | 13 | 16 | 18 |
|  | 13 | 12 | 10 | 12 | 15 | 18 | 20 |

FIG. 17

| SCORE | LEVEL OF ANOMALY |
|---|---|
| 2~4 | MONITORING OVER TIME |
| 5~9 | RECOMMENDATION FOR CHECKUP |
| 10~ | STRONGER RECOMMENDATION FOR CHECKUP |

FIG. 18

| No. | EXAMPLES OF COMBINATIONS | | |
|---|---|---|---|
| 1 | SHAFT VIBRATION | BEARING VIBRATION | – |
| 2 | BEARING VIBRATION | STATOR VIBRATION | – |
| 3 | STATOR CORE VIBRATION | STATOR VIBRATION | – |
| 4 | DRIVE-SIDE SHAFT VIBRATION | DRIVEN-SIDE SHAFT VIBRATION | THIRD BEARING SHAFT VIBRATION |
| 5 | DRIVE-SIDE BEARING VIBRATION | DRIVEN-SIDE BEARING VIBRATION | THIRD BEARING BEARING VIBRATION |

US 11,972,642 B2

ROTATING MACHINERY DIAGNOSIS AND MONITORING DEVICE AND METHOD

CLAIM OF PRIORITY

The present application claims priority from Japanese Patent Application JP 2020-053906 filed on Mar. 25, 2020, the content of which is hereby incorporated by reference into this application.

BACKGROUND OF THE INVENTION

The present invention relates to a device and method for diagnosing and monitoring rotating machinery.

A large number of rotating machines are used in plants and other facilities. The rotating machinery has a structure that a rotor is supported at a bearing portion and rotates. Therefore, abnormal sounds or vibrations may occur.

Many diagnosis and monitoring technologies are proposed to address such abnormality. According to a technology disclosed in a document JP2007-10415, an equipment maintenance computer 17 included in a bearing abnormality diagnostic system 20 calculates a representative value of vibration data of a bearing 13 measured by an acceleration pickup 15 after receiving the vibration data. The computer 17, based on model data of the bearing 13 and rotation speed information acquired from PLC 3, reads a corresponding diagnostic threshold value from a database 19 and compares the diagnostic threshold value with the representative value for diagnosis of abnormality in the bearing 13.

According to the diagnosis and monitoring technology disclosed in JP2007-10415, an abnormality diagnosis can be performed at the time of vibration occurrence. Unfortunately, the technology often includes a problem of being inappropriate to make a determination including a symptom trend or the progress of vibrations since abnormality is determined based on the relationship of a predetermined vibration value with a threshold value.

SUMMARY OF THE INVENTION

It is an object of the present invention to provide a rotating machinery diagnosis and monitoring device and method which have high reliability and enable the grasping of a symptom trend of vibrations and a determination of progress of the vibrations during increase and decrease in the rotation speed of a rotor.

A rotating machinery diagnosis and monitoring device of the present invention, comprising: an input section that receives vibration values and rotation speeds as operation data of a rotating machine; a computing section that performs computations using the operation data received; and a calculator that includes an output section. The computing section is configured to identify peak values of the vibration values and evaluate each of magnitude of the peak values and the rotation speeds at the peak values. The output section is configured to display externally a result of evaluations performed by the computing section.

A rotating machinery diagnosis and monitoring method using vibration values and rotation speeds which are operation data of a rotating machine, comprising the steps of: identifying peak values of the vibration values; and evaluating each of magnitude of the peak values and the rotation speeds at the peak values.

According to the present invention, a rotating machinery diagnosis and monitoring device and method is provided which have high reliability and enable the grasping of a symptom trend of vibrations and a determination of progress of the vibrations during increase (speedup) and decrease (slowdown) in the rotation speed of a rotor.

BRIEF DESCRIPTION OF THE DRAWINGS

FIG. 8 is a diagram illustrating a table of shaft vibration values and the rotation speeds at a time when the shaft vibration is at peak under speedup;

FIG. 9 is a diagram illustrates a table of shaft vibration values and the rotation speeds at a time when the shaft vibration is at peak under slowdown;

FIG. 10 is a diagram illustrating one example of a processing program Pg2 for a processing analysis process;

FIG. 12 is a diagram illustrating an example configuration of a database DBB2 with data indicating an area division between the rotation speed and the shaft vibration;

FIG. 13 is a diagram illustrating an example of a score table for evaluation of the rotation speed;

FIG. 14 is a diagram illustrating an example of a score table for evaluation of the shaft vibration;

FIG. 15 is a diagram illustrating an example of a score table for evaluation in which the relationships of the rotation speeds and the shaft vibration values with the threshold values are organized in a single tabular form with columns and rows;

FIG. 16 is a diagram illustrating an easy-to-see format of a comprehensive evaluation result;

FIG. 17 is a diagram illustrating levels of abnormality indicated by comprehensive scores on a score basis; and FIG. 18 is a diagram illustrating possible combinations for difference determination.

DETAILED DESCRIPTION OF THE PREFERRED EMBODIMENTS

A rotating machinery diagnosis and monitoring device and method according to an embodiment of the present invention will now be described with reference to the drawings.

Embodiment

Figure 1:
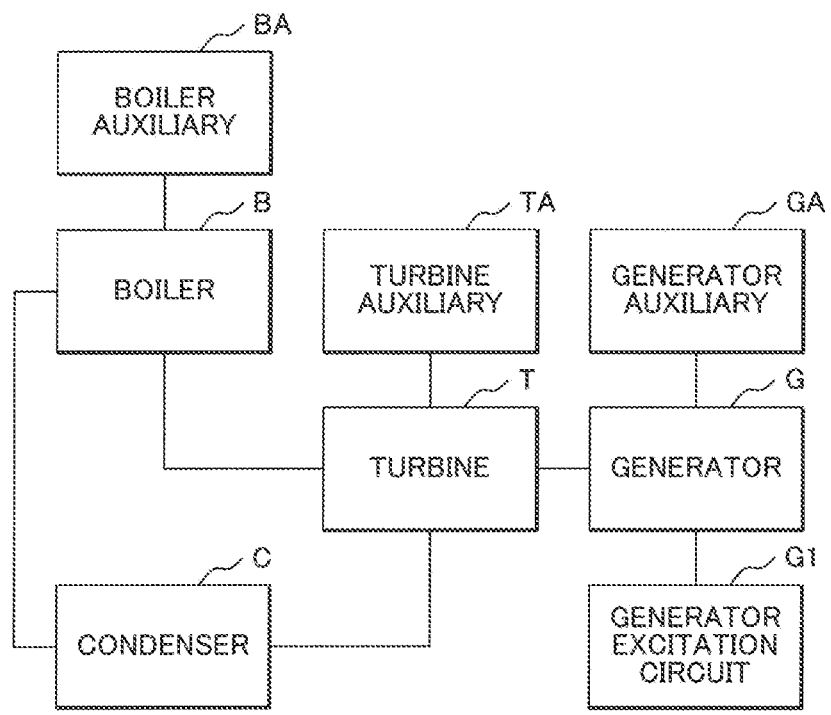
FIG. 1 is a block diagram illustrating an example configuration of equipment in a thermal power plant which is a specific example of application of a plant operation data processing device according to the present invention.

FIG. 1 illustrates an example configuration of equipment in a thermal power plant which is a specific example of application of a plant operation data processing device according to an embodiment of the present invention.

The thermal power plant includes components roughly grouped into a generator G, a turbine T, and a boiler B, which are called main machine. Equipment or equipment groups installed for maintaining the functionality of the main machine is called auxiliaries. In FIG. 1, auxiliaries includes a generator auxiliary GA, a turbine auxiliary TA, and a boiler auxiliary BA, and may include a condenser C and a generator excitation circuit G1.

Most of the main machine and auxiliaries are rotating machines. For example, the generator G is an electric rotating machine, and the turbine T is a mechanical rotating machine. In addition, a feed-water pump of a condenser system and a drive electric motor of the feed-water pump are also large-size rotating machines. Many other electric motors are installed in the thermal power plant. Such rotating machines are supported on bearing units in at least two locations. Because of this configuration, there is a need to make an effort to detect abnormality in the rotating machine at an early stage by measuring and monitoring vibrations in several locations including the bearing units.

Figure 2:
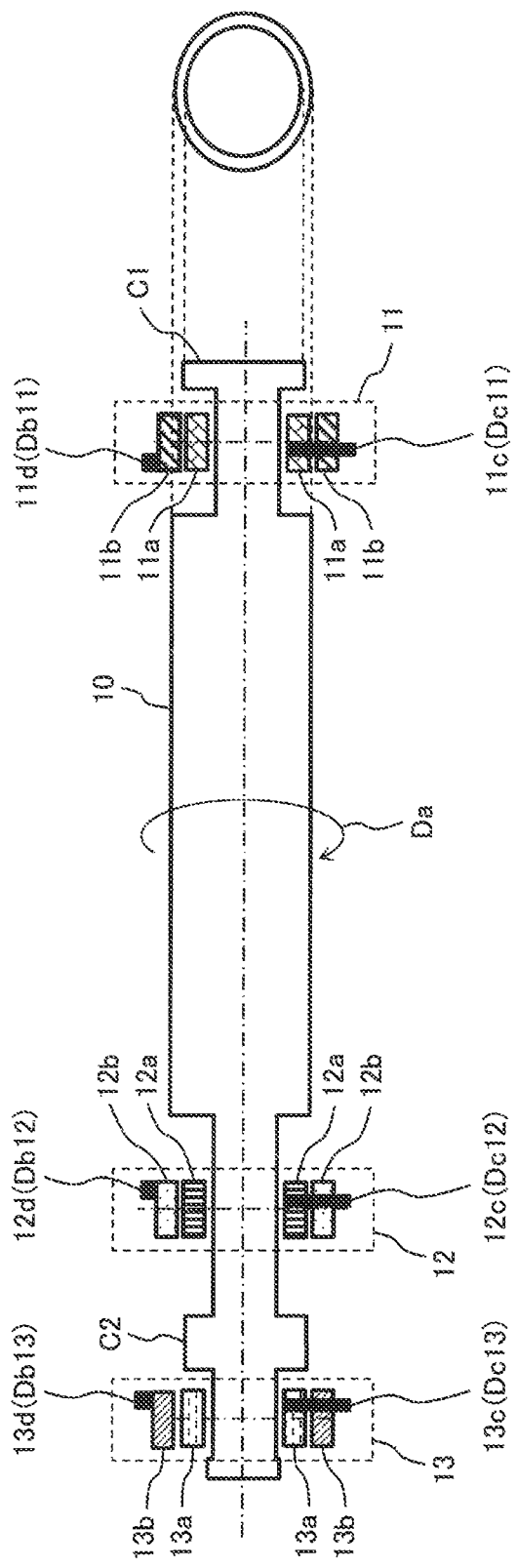
FIG. 2 is a diagram illustrating a rotor in a generator which is a typical rotating machine.

FIG. 2 is a diagram illustrating mainly a rotor in the generator which is a typical rotating machine. On a generator shaft (rotor) 10 in FIG. 2, a coupling C1 between a generator rotor and a turbine shaft is formed on the right side, and a coupling C2 between a third shaft bearing and the rotor is formed on the left side. The generator shaft (rotor) 10 is supported by left and right bearing units 11, 12, 13 which are respectively a drive-side bearing unit 11, a driven-side bearing unit 12, and a third bearing unit 13. Bearings 11a, 12a, 13a are housed in bearing boxes 11b, 12b, 13b, respectively. The bearings 11a, 12a, 13a are provided with shaft vibration meters 11c, 12c, 13c. The bearing boxes 11b, 12b, 13b are provided with bearing vibration meters 11d, 12d, 13d. The shaft vibration meters 11c, 12c, 13c detect shaft vibration Dc (Dc11, Dc12, Dc13). The bearing vibration meters 11d, 12d, 13d detect bearing vibration db (Db11, Db12, Db13).

It is noted that, the shaft vibration Dc (Dc11, Dc12, Dc13) can include a factor of the bearing vibration db (Db11, Db12, Db13) according to the support configurational relationship between the bearings 11a, 12a, 13a and the bearing boxes 11b, 12b, 13b and the mounting relationship between the shaft vibration meters 11c, 12c, 13c and the bearing vibration meters 11d, 12d, 13d.

In the present invention, attention is paid to the operation data of the shaft vibration Dc and the bearing vibration db from the shaft vibration meters 11c, 12c, 13c and the bearing vibration meters 11d, 12d, 13d which are installed in the rotating machines in the plant site. A calculator receives the above operation data, together with operation data of the rotation speed Da, via a sensor, a communication section, an input section, and/or other components. A configuration employed for this purpose may be a well-known configuration.

Figure 3:
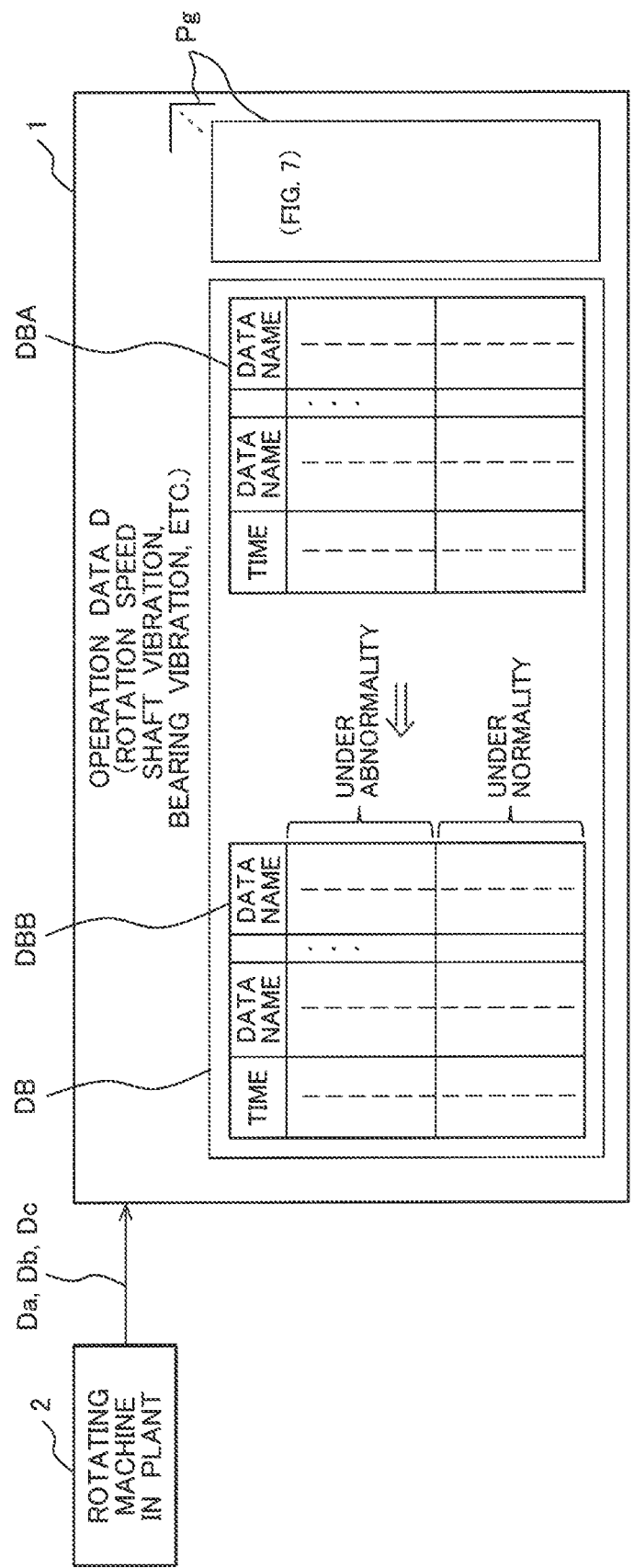
FIG. 3 is a diagram illustrating an example configuration of a plant operation data processing device.

FIG. 3 is a diagram illustrating an example configuration of a diagnosis and monitoring device. In FIG. 3, a diagnosis and monitoring device 1 including a calculator receives the plant operation data D into the calculator 1 via a communication section and/or an input section from sensor/sensors (not shown in FIG. 3) installed in a rotating machine 2 in the plant. The operation data D in this embodiment includes the shaft vibration Dc (Dc11, Dc12, Dc13) from the shaft vibration meters 11c, 12c, 13c, the bearing vibration db (Db11, Db12, Db13) from the bearing vibration meters 11d, 12d, 13d, and the rotation speed Da of the rotating machine 2.

In the calculator 1, an internal database DB stores the rotation speed Da, the bearing vibration db, and the shaft vibration Dc as the operation data in a time series. In this case, at least a data collection time, name and values of the operation data are related with each other and stored in a time series in a storage format in an early stage as illustrated in a database DBA.

The calculator 1 also has processing program Pg stored therein. The processing program Pg describes processing procedure to handle the received operation data Da, db, Dc. The received operation data is processed and executed sequentially in a computing section according to the processing program Pg.

Finally, the computation result at the computing section is externally displayed as processed information in an easy-to-read format through an output section such as a monitor.

Next, before processing details in the diagnosis and monitoring device 1 is described, the relationship among the shaft vibration Dc (Dc11, Dc12, Dc13), the bearing vibration db (Db11, Db12, Db13), and the rotation speed Da, which is a precondition of the processing details, is described separately for when the conditions are normal and when conditions are abnormal. The processing details in the diagnosis and monitoring device 1 incorporate the result of the response analysis.

Figure 4:
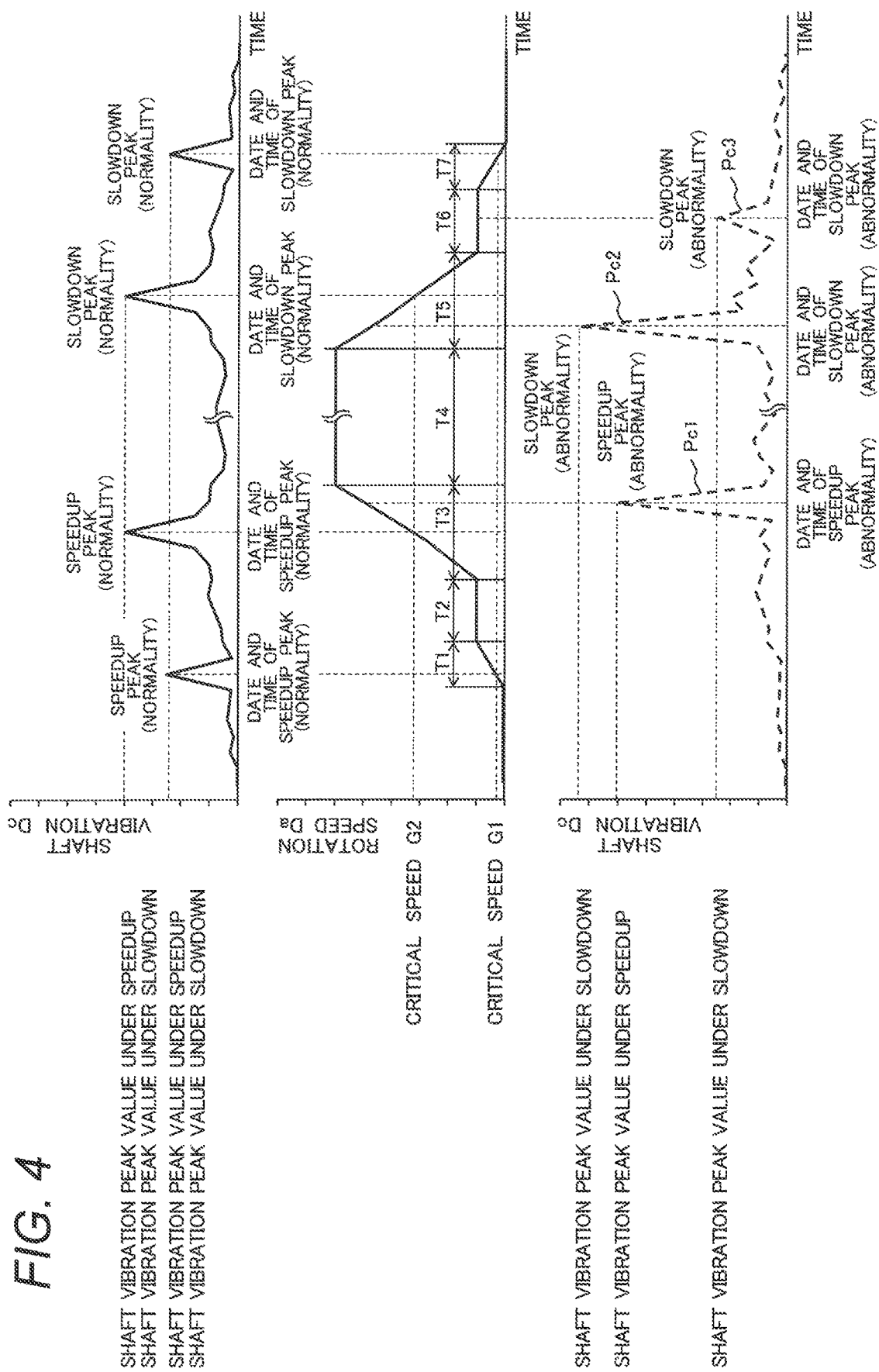
FIG. 4 is a diagram illustrating the relationship between shaft vibration Dc (Dc11, Dc12, Dc13) and the rotation speed Da.
Figure 5:
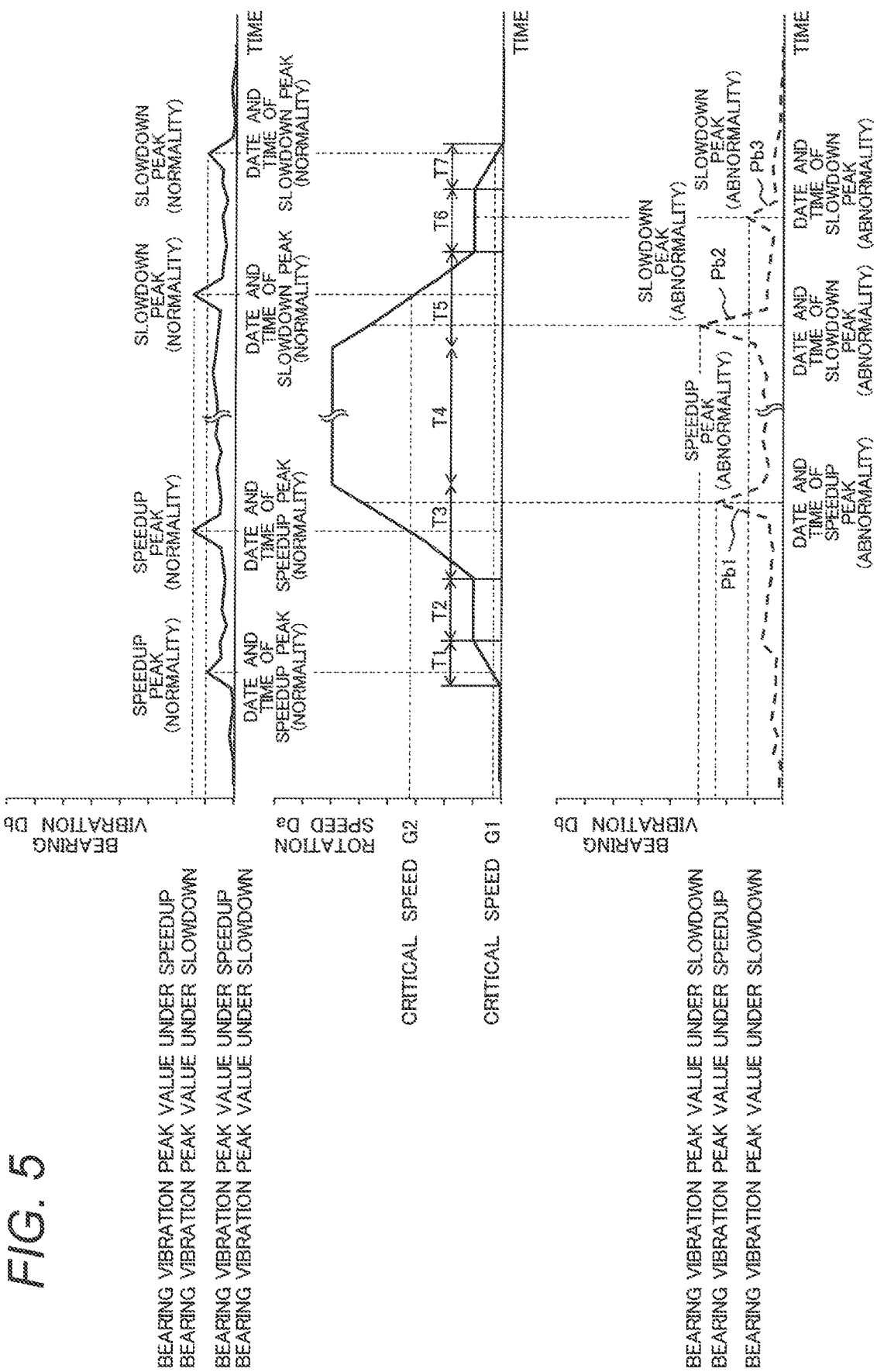
FIG. 5 is a diagram illustrating the relationship between bearing vibration db (Db11, Db12, Db13) and the rotation speed Da.
Figure 6:
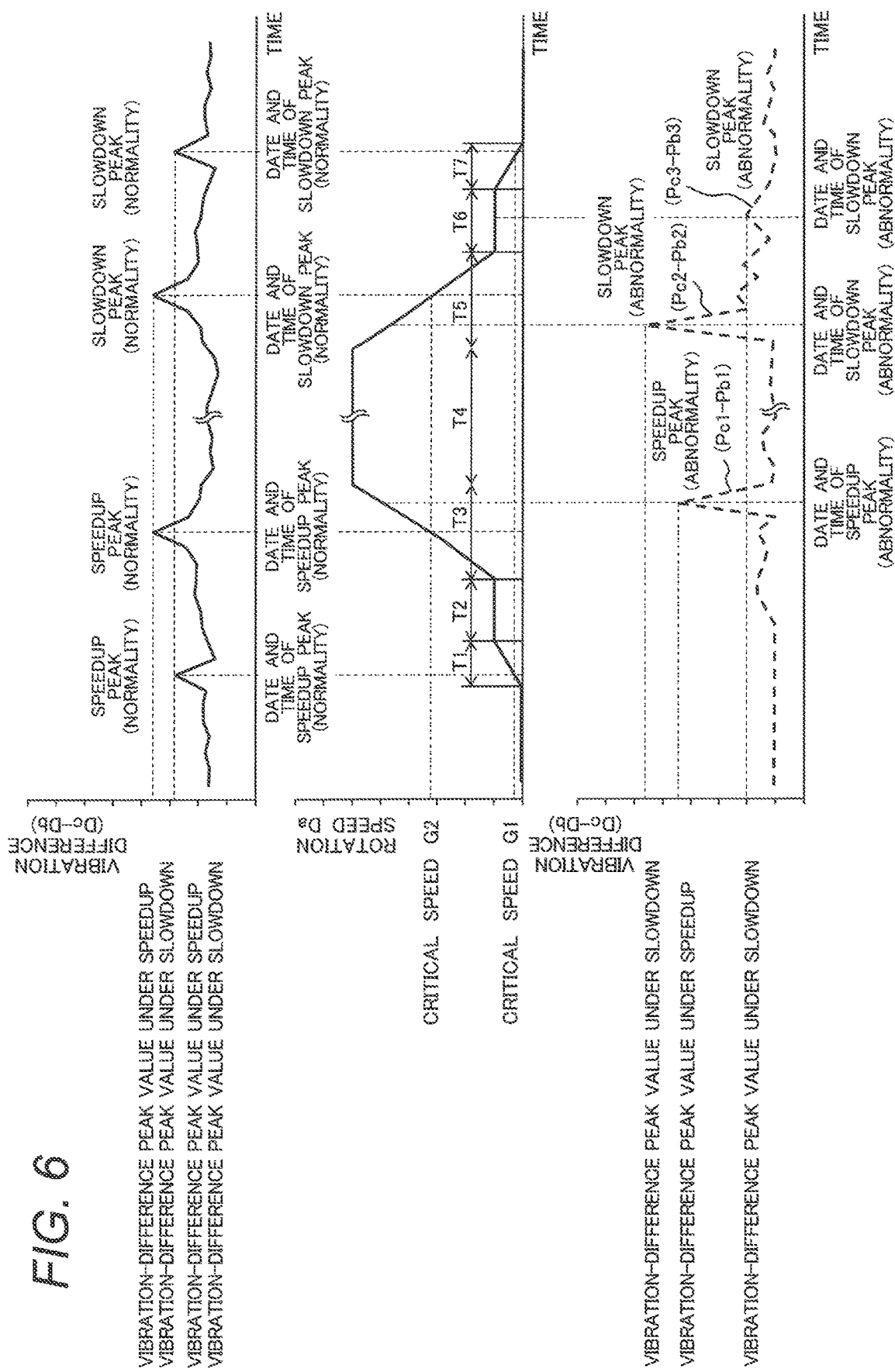
FIG. 6 is a diagram illustrating the relationship between the rotation speed Da and a difference between the shaft vibration Dc (Dc11, Dc12, Dc13) and the bearing vibration db (Db11, Db12, Db13)

With reference to FIGS. 4, 5, and 6, the relationship between the vibration and the rotation speed is described. FIG. 4 is a diagram illustrating the relationship between the shaft vibration Dc (Dc11, Dc12, Dc13) and the rotation speed Da, organized in terms of the passage of time represented by the horizontal axis. FIG. 5 is a diagram illustrating the relationship between the bearing vibration db (Db11, Db12, Db13) and the rotation speed Da, organized in terms of the passage of time. FIG. 6 is a diagram illustrating the relationship between the rotation speed Da and a difference between the shaft vibration Dc (Dc11, Dc12, Dc13) and the bearing vibration db (Db11, Db12, Db13), organized in terms of the passage of time.

The above figures only differ in type of vibrations of interest. In each figure, the vibration under normal conditions is shown in the top stage, usual transition of the rotation speed in a process from the start to the stop is shown in the middle stage, and vibrations under the abnormal conditions is shown in the bottom stage. For example, with reference to FIG. 4, when the rotation speed Da in the middle stage of FIG. 4 is representatively described, the rotation speed Da has patterns of speedup and slowdown so that the rotation speed Da varies from a stop state, through a first stage speedup state T1, a first stage stop state T2, a second stage speedup state T3, a rated speed operation state T4, a first stage slowdown state T5, a second stage stop state T6, and a second stage slowdown state T7, back to the stop state.

In the speedup process and the slowdown process in such a rotating machine, a critical speed region G exists in which the rotating machine vibrates. Therefore, the patterns of speedup and slowdown are defined so that the critical speed region G is passed through without stopping. The critical speed region G in the embodiment includes critical speed regions G1, G2 in FIG. 4. Therefore, in the speedup and slowdown processes of the rotating machine, the vibration meter detects large vibration (peak) in the critical speed region G.

The vibration can be pre-grasped during the design phase of the rotating machine and can be experimentally verified during commissioning after the installation of the rotating machine. Because the vibration is predictable in this way, the vibration may be considered as normal vibration in a sense. The normal vibration in the predicted critical speed region is illustrated as the vibration waveform in the top stage of each of FIGS. 4, 5, and 6. This means that even if the vibration is detected, the normal vibration is identified from the relationship of the vibration with the rotation speed in the critical speed region.

In contrast to this, the waveform when vibration is detected despite the outside of the predicted critical speed region G is shown in the bottom stage of in each of FIGS. 4, 5, and 6. Peak values of the vibrations are illustrated as Pc1, Pc2, Pc3 in FIG. 4 and Pb1, Pb2, Pb3 in FIG. 5. These peak values are not occurred when the rotation speed is within the predicted critical speed region G. Therefore, the vibration is considered as exhibiting abnormalities. The peak values Pc1, Pb1 are pertinent to abnormal vibration under speedup. The peak values Pc2, Pb2 and Pc3, Pb3 are pertinent to abnormal variation under slowdown. These peak values are obtained together with the rotation speeds at the peak values. Thus, the magnitude of the peak values (vibration value) themselves and the rotation speeds at the peak values are evaluated. Based on the results of both the evaluation of the magnitude of the vibration values at the peak values and the evaluation of the rotation speeds, the peak of the vibration is evaluated whether indicating an abnormality or not.

FIG. 6 shows a difference between the shaft vibration Dc (Dc 11, Dc12, Dc13) and the bearing vibration db (Db11, Db12, db 13) in a similar manner to FIGS. 4 and 5. In FIGS. 4 and 5, a signal from each single sensor is analyzed and illustrated. The signals from sensors may exert influence on each other depending on how the sensors are mounted and other conditions. In FIG. 6, the difference is illustrated because the difference should be paid attention and evaluated. A similar difference evaluation is desirably made by performing analyses on a wide range of combinations selected based on the relationship between the bearings mounted in different locations. FIG. 18 illustrates possible combinations for difference determination. Monitoring the wide range of these combinations enables detection of events which are not detected by a single sensor. In addition, such monitoring is helpful in a factor analysis for estimating/identifying a factor of abnormality.

Figure 7:
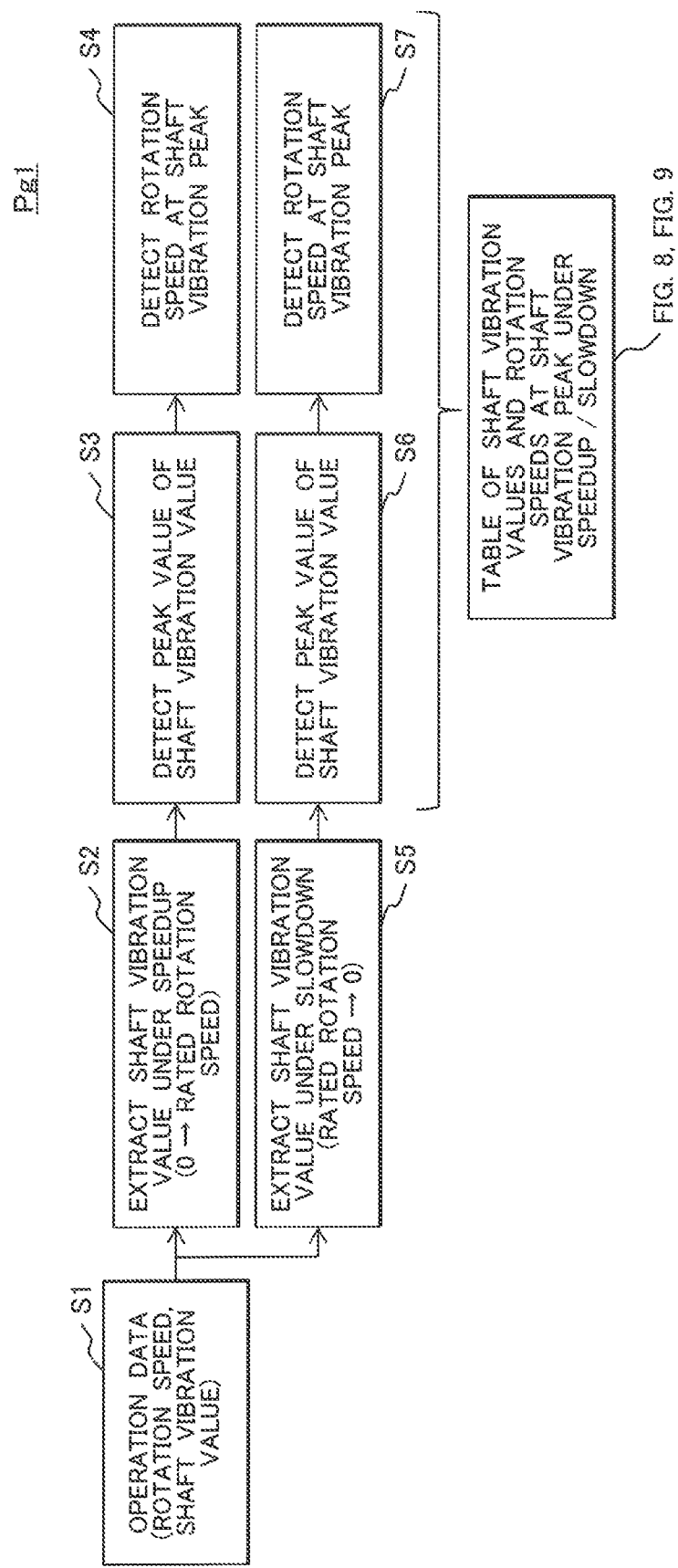
FIG. 7 is a diagram illustrating a processing program Pg1 for a process of identifying a critical speed and a vibration value.

The plant operation data processing device according to the present invention executes the processing program Pg illustrated in FIG. 3 by using the relationship between the vibration and the rotation speed illustrated in FIG. 4, FIG. 5, FIG. 6. The processing program Pg in FIG. 3 includes multiple processing programs. FIG. 7 illustrates the processing program Pg1 of the multiple processing programs. The processing program Pg1 is a program for the process of identifying a critical speed and a vibration value.

In an initial processing step S1 in FIG. 7, the rotation speed Da and vibration (the shaft vibration Dc (Dc11, Dc12, Dc13), for example in this embodiment) are input as operation data.

In the subsequent processing step S2, the shaft vibration under speedup is extracted. Similarly, the shaft vibration under slowdown is extracted in the processing step S5. The operation data may be extracted online from the rotating machine or may be extracted from data temporarily stored in the database DBA in the calculator. In either case, the data collection time is combined with the rotation speed and the vibration value. A distinction between speedup and slowdown may be determined by using the start and stop patterns or the direction of change in speed. It is noted that in subsequent processing steps following the processing step S2 and the processing step S5, the same processing with each other is basically performed. Therefore, the description of the processing for the shaft vibration under speedup represents descriptions of the following processing steps.

In the processing step S3, peak values of the shaft vibration under speedup are detected. The peak values can be detected as maximum local values at which the shaft vibration value turns from increase to decrease or minimum local values at which the shaft vibration value turns from decrease to increase. The peak values thus detected are normal peak values in the critical speed region G illustrated in the top stage of FIG. 4, and also abnormal peak values out of the critical speed region G illustrated in the bottom stage of FIG. 4. However, at this stage, the peak values are merely recognized as peaks of the shaft vibration, not distinguished as normal or abnormal. Similarly, in the processing step S6, the peak values of the shaft vibration under slowdown are detected.

In a processing step S4, the rotation speed at the time when the shaft vibration is at peak is identified from the stored combination data of the data collection times, the rotation speeds, and the vibration values. If the peak value is normal, the corresponding rotation speed in the critical speed region is identified. If the peak value is abnormal, the corresponding rotation speed is identified. Likewise, in the processing step S8, the rotation speed at the peak under slowdown is identified.

As a result of performing the series of above processing steps for all the operation data, the data groups as illustrated in FIG. 8, FIG. 9 are created in the database DBB of the plant operation data processing device.

In a database DBB1U illustrated in FIG. 8, a table of the shaft vibration values and the rotation speeds at the time when the shaft vibration is peak under speedup is created and stored. In a database DBB1D illustrated in FIG. 9, a table of the shaft vibration values and the rotation speeds at the time when the shaft vibration is peak under slowdown is created and stored. In each of the tables, columns d1, d2, d3, d4 are formed to store a peak name for identifying each peak, a date and time of measurement, the rotation speed, and a shaft vibration value. Each peak value is newly retained in an illustrated format in FIG. 8. It may be understood that this process is a process to add a peak name newly to the initially stored combination data of the data collection time, the rotation speeds, and the vibration values. Further, it may be understood that databases are created separately for under speedup and under slowdown in this process.

Through the above analyses and processing, the tables of the shaft vibration values and the rotation speeds at the time when the shaft vibrations are peak under speedup and under slowdown are created in the database DBB1. Further, it is desirable that the tables are created for each of bearings (the drive-side bearing unit 11, the driven-side bearing unit 12, the third bearing unit 13) in FIG. 2, created for each of the vibrations (the shaft vibrations Dc (Dc11, Dc12, Dc13), the bearing vibrations db (Db11, Db12, Db13)), and the differences between the vibrations, created for each of start and stop operation modes (under speedup, at a rated rotation speed, under slowdown), and created for each critical speed region.

Based on the data input and processed as described above, a processing analysis program Pg2 of the processing program Pg is activated in the calculator 1 illustrated in FIG. 3. FIG. 10 illustrates an example of the processing program Pg2 for the processing analysis process.

In an initial processing step S11 of the processing program Pg2 in FIG. 10, the tables of the shaft vibration values and the rotation speeds at the time when the shaft vibrations are peak under speedup and slowdown in FIGS. 8, 9 are referred. In a processing step S12, the relationships between the shaft vibration values and the rotation speeds under speedup and slowdown illustrated in the top stage and the bottom stage in FIGS. 4, 5, 6 are also referred. A relationship illustrated in FIG. 11 is defined through these references.

Figure 11:
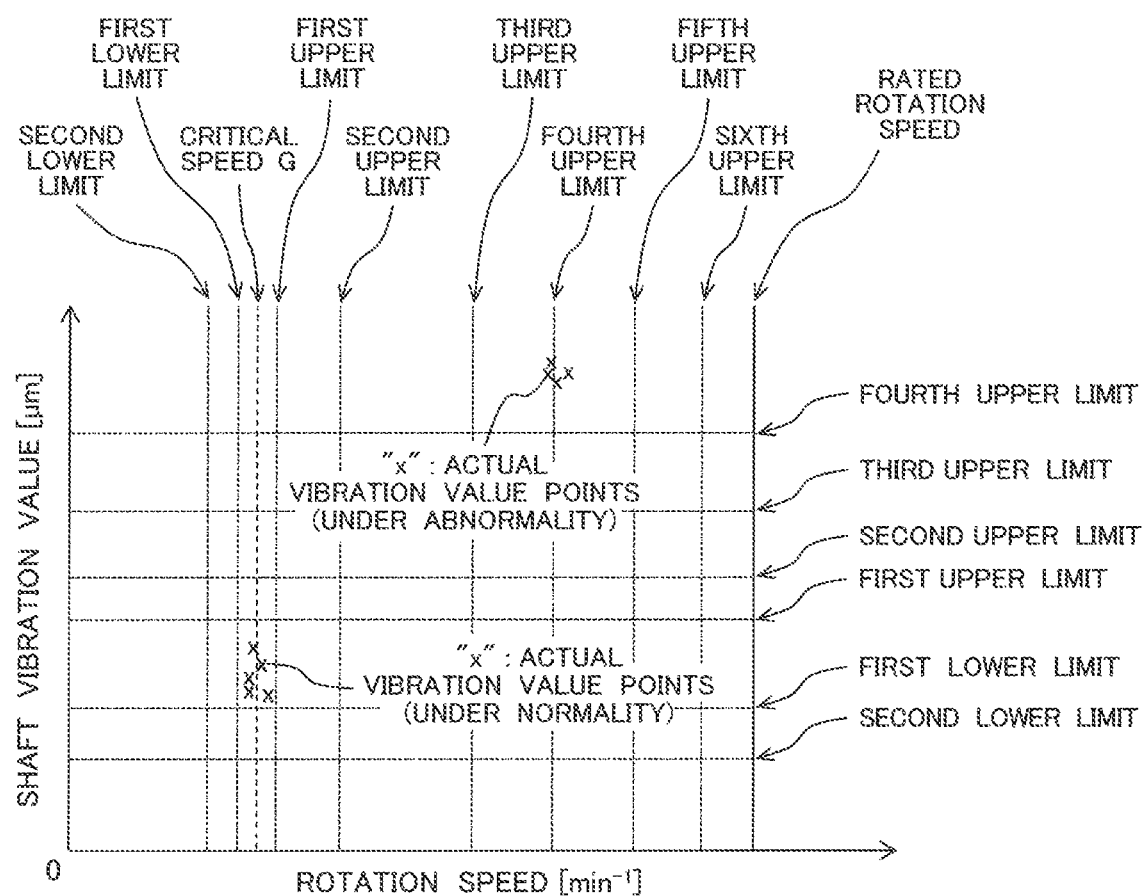
FIG. 11 is a diagram illustrating one typical example in the table of the shaft vibration values and the rotation speeds at the time when the shaft vibration is at peak, organized in terms of the relationship between the shaft vibration values and the rotation speeds.

FIG. 11 is a diagram illustrating one typical example in the tables of the shaft vibration values and the rotation speeds at the time of the peak of the shaft vibration which are obtained through multifaceted analysis, organized in terms of the relationship between the shaft vibration values and the rotation speeds. In FIG. 11, the shaft vibration values and the rotation speeds are represented by the vertical and horizontal axes, respectively, and the peak values are plotted. That is, the peak values are shown in a plane defined by the rotation speed and the shaft vibration in FIG. 11.

In FIG. 11, several shaft vibrations are detected in a left lower area and other several shaft vibrations are detected in a right upper area. The rotation speeds of the plotted points in the left lower area are located in proximity to the critical speed G, and their shaft vibration values are located within a predetermined range. In contrast, the plotted points in the right upper area locate in an area obviously away from the left lower normal area, showing speeds not recognized as the critical speed G, and indicating the vibration not to be normal.

In the example in FIG. 11, regarding the rotation speed on the horizontal axis, indexes with respect to the critical speed are set such as a first upper limit of larger rotation speed than the critical speed G and a first lower limit of smaller rotation speed than the critical speed G, and a second upper limit larger than the first upper limit and a second lower limit smaller than the first lower limit, and further third to sixth upper limits between the second upper limit and the rated rotation speed. Similarly, regarding the shaft vibration value on the vertical axis, a first upper limit and a first lower limit are set as defining the area including the left lower plotted points of the normal vibrations, and other upper limits and lower limits are set in stages. It can be understood that, in the setting of the upper limits and the lower limits, a two-dimensional plane defined by the rotation speeds and the shaft vibration values is divided into areas by a plurality of upper and lower limit values set horizontally and vertically. It can also be understood that the setting of the upper limits and the lower limits is a setting of threshold values for the area division.

In the processing program Pg 2 for the processing analysis process illustrated in FIG. 10, the division of the areas in FIG. 11 are set by using (a) the tables of the shaft vibration values and the rotation speeds at the time when the shaft vibrations are peak under speedup and slowdown in FIG. 8 and FIG. 9 which is of interest in the processing step S11, and (b) the relationship between the vibration values and the rotation speeds under speedup and slowdown illustrated in the top stages and the bottom stages of FIGS. 4, 5, and 6 which is of interest in the processing step S12.

In the processing step S13 in FIG. 10, the plotted points defined by the rotation speed and the shaft vibrations are compared with the threshold values to perform area division for indicating a position of each of the plotted points. As a result of the processing in the processing step S13, a database DBB2 illustrated in FIG. 12 is created. The database DBB2 additionally includes data indicating the area division for the rotation speed and the shaft vibration.

Specifically, for example, the areas are set in the two-dimensional plane defined by the vibration values and the rotation speeds in a way that (a) the first upper limit and the first lower limit of the rotation speed are set with a boundary of the critical speed region, (b) the second upper limit and the second lower limit of the rotation speed are set in the rotation speed positions located farther than the first upper limit and the first lower limit of the rotation speed, (c) the first upper limit and the first lower limit of the vibration value is set to define the most normal area as the vibration value in the critical speed, and (d) the second upper limit and the second lower limit of the vibration value are set in vibration value positions located farther than the first upper limit and the first lower limit of the vibration value.

The database DBB2 in FIG. 12 is created by adding columns d5, d6 to the database DBB1U and the database DBB1D in FIG. 8 and FIG. 9. In the column d5, the rotation speeds at which each individual peak value exists are defined by threshold value ranges. In the column d6, the shaft vibration values at each individual peak value are defined by threshold value ranges. With this configuration, the positions in the two-dimensional plane of the shaft vibrations and the rotation speeds at which the peaks exist are defined in the database DBB2 as digital information.

In a processing step S14 in FIG. 10, a score table of evaluation of the rotation speed illustrated in FIG. 13 is referred. In a processing step S15, a score table of evaluation of the shaft vibration illustrated in FIG. 14 is referred. These evaluation score tables are prepared in advance. Each of the tables is configured such that, if the rotation speed or the shaft vibration falls within the normal area, the score is zero, but as the rotation speed or the shaft vibration is farther from the normal area, the score is increases to indicate a higher degree of abnormality. For example, if the first upper limit is a threshold value, a score is 2, and if a threshold value is positioned between the second upper limit and the first upper limit, a score is 5. Thus, a score is given to each individual peak in terms of the rotation speed and the shaft vibration. It is noted that more careful monitoring is required as the score is higher.

FIGS. 13 and 14 respectively show the relationships between the rotation speed and the threshold value and between the shaft vibration value and the threshold value, the relationships being organized in different tables. As illustrated in FIG. 15, the relationships of the rotation speeds and the shaft vibration values with the threshold values may be organized in a single tabular form with columns and rows.

In a processing step S16 in FIG. 10, a comprehensive score is determined for the rotating machine of interest. The determination in FIG. 12 and the giving of a score in FIG. 13, 14 or 15 are illustrated by way of example for each of a location of vibration measurement, a type of vibration, operation conditions (speedup, rated rotation, slowdown), and vibration area of a practical rotating machine of interest. However, in actuality, for each of the above conditions, a large number of determinations in FIG. 12 and a large number of counts of score-giving in FIG. 13, 14 or 15 are made, and such determinations and given scores are stored and accumulated as data. Accordingly, there is a necessity to perform the comprehensive evaluations in order to evaluate the entire rotating machine.

FIG. 16 is a table in an easy-to-see form of the comprehensive evaluation result. In this table, columns and rows represent threshold values of the rotation speed and the shaft vibrations, and sum values of scores of peaks located in the areas divided by the threshold values are illustrated in the areas.

In a processing step S17 in FIG. 10, a comment about a level of abnormality for each score is given as a level of abnormality indicated by the comprehensive score in each area in FIG. 16. For example, as illustrated in FIG. 17, recommendation is made such that the scores of 2 to 4 correspond to a stage of monitoring over time, the scores of 5 to 9 correspond to a stage of recommendation for checkup, and the scores of 10 or higher correspond to a stage of strong recommendation for checkup. In a processing step S18, the analysis contents are displayed in an easy-to-see form on a monitor or other device.

For example, the contents of each database are displayed and externally presented on the monitor in a format as illustrated in FIG. 8, FIG. 9, and FIGS. 12 to 17. Alternatively, the contents of each database may be externally presented in a two-dimensional plane as the relationship between the plotted points and the threshold values such as in FIG. 11. In particular, on the presentation as in FIG. 16, a position with many abnormality points is evaluated and presented in terms of magnitude, allowing an operator to easily determine a diagnosis of abnormality.

In this manner, according to the above embodiment, the diagnosis and monitoring device includes an input section that receives vibration values and rotation speeds as operation data of a rotating machine, a computing section that performs computations using the operation data received, and a calculator that includes an output section. The computing section is configured to identify peak values of the vibration values and evaluate each of magnitude of the peak values and the rotation speeds at the peak values. The output section is configured to display externally a result of evaluations performed by the computing section.

Preferably, the rotating machine includes a plurality of vibration meters. The two-dimensional plane is one of a plurality of two-dimensional planes that are created for each of vibration values detected by the vibration meters. The output section displays externally the two-dimensional plane in which the scores in each of the areas of the two-dimensional planes determined for each of the vibration meters are added up together.

Preferably, the two-dimensional plane is one of a plurality of two-dimensional planes that are created for each of critical speed regions of the rotation speeds. The output section displays externally one two-dimensional plane in which the scores are added up together in each of the areas in the two-dimensional planes.

With these features, the rotating machine diagnosis and monitoring device and method is provided which have high reliability and enable the grasping of a symptom trend of vibrations and a determination of progress of the vibrations during increase and decrease in the rotation speed of a rotor.

More specifically, the rotation speeds and the shaft vibration values are transmitted from at least one of rotating machine in a power plan, measuring instruments of the rotating electric machine, and a computing device. Critical speeds under speedup/slowdown and/or changes in correlation of the shaft vibration values at the critical speeds under speedup/slowdown are plotted by using the rotation speeds and the shaft vibration values. Thereby, the detection of abnormality symptoms and/or abnormality is enabled with high reliability.

REFERENCE SIGNS LIST

1 . . . Diagnosis and monitoring device
2 . . . rotating machine in plant
10 . . . Generator shaft
11, 12, 13 . . . Bearing
G . . . Generator
T . . . Turbine
B . . . Boiler
GA . . . Generator auxiliary
TA . . . Turbine auxiliary
BA . . . Boiler auxiliary
C . . . Condenser
G1 . . . Generator excitation circuit

What is claimed is:

1. A rotating machinery diagnosis and monitoring system, comprising:
a vibration meter;
a rotation speed sensor; and
a diagnosis and monitoring device including one or more processors and one or more non-transitory computer-readable storage media, the non-transitory computer-readable storage media having stored thereon an input section, a computing section and an output section, wherein,
the input section receives vibration values from the vibration meter and rotation speeds from the rotation speed sensor as operation data of a rotating machine;
the computing section performs computations using the operation data received; and
wherein the computing section is configured to identify peak values of the vibration values and evaluate a degree of abnormality of the rotating machine from magnitude of the peak values of the vibration values and/or the rotation speeds at the peak values of the vibration values, and
wherein the output section is configured to display externally a result of evaluations performed by the computing section, and
wherein the computing section is configured to evaluate the degree of abnormality from the rotation speeds at the peak values of the vibration values based on an index with respect to a critical speed,
wherein the computing section is further configured to create a two-dimensional graph in which points are plotted in a coordinate system with coordinate axes indicating the vibration values and the rotation speeds, the points being defined by the peak values and the rotation speeds corresponding to the peak values, and
wherein the output section is further configured to display externally the two-dimensional graph created by the computing section,
wherein the two-dimensional graph is divided into multiple rectangular areas, each of the multiple rectangular areas defined by a first vibration level, a second vibration level that is greater than the first vibration level, a first rotation speed and a second rotation speed that is greater than the first rotation speed,
wherein the multiple rectangular areas are divided at least into a first area in proximity to a critical speed region of the rotating machine and a second area that exists in a position away from the first area, and wherein, in an evaluation of a degree of abnormality by using the rotation speeds corresponding to the peak values, for any magnitudes of the vibration that give the peak values a degree of abnormality is evaluated to be higher when the points defined by the peak values and the rotation speeds corresponding to the peak values are plotted in the second area than when the points defined by the peak values and the rotation speeds corresponding to the peak values are plotted in the first area.

2. The rotating machinery diagnosis and monitoring system according to claim 1,
wherein the computing section gives scores to the peak values of the vibration values plotted in the areas for each of the peak values,
wherein the computing section gives higher scores to the peak values of the vibration values plotted in the second area than the scores to the peak values of the vibration values plotted in the first area,
wherein the computing section diagnoses a level of abnormality based on the scores given to the peak values, and
wherein the output section is configured to display externally the level of the abnormality diagnosed by the computing section.

3. The rotating machinery diagnosis and monitoring system according to claim 1,
wherein the rotating machine includes a plurality of vibration meters,
wherein the two-dimensional graph is one of a plurality of two-dimensional graphs that are created for each of vibration values detected by the vibration meters,
wherein the output section displays externally the two-dimensional graph in which the scores in each of the areas of the two-dimensional graphs determined for each of the vibration meters are added up together.

4. The rotating machinery diagnosis and monitoring system according to claim 1,
wherein the two-dimensional plane is one of a plurality of two-dimensional graphs that are created for each of critical speed regions of the rotation speeds, and
wherein the output section displays externally one two-dimensional graphs in which the scores are added up together in each of the areas in the two-dimensional graphs.

5. The rotating machinery diagnosis and monitoring system according to claim 1,
wherein the rotating machine includes a plurality of vibration meters to detect vibrations of bearing units on a drive-side and a driven-side, and
wherein the computing section creates a two-dimensional graph for vibration from each of the vibration meters, and creates a two-dimensional graph for vibration of each difference between vibrations from the vibration meters, and
wherein the output section displays externally the two-dimensional graphs created by the computing section.

6. The rotating machinery diagnosis and monitoring system according to claim 2,
wherein the areas are set in the two-dimensional graph defined by the vibration values and the rotation speeds in a way that,
a first upper limit and a first lower limit of a rotation speed are set with a boundary between the first area and another area,
a second upper limit and a second lower limit of the rotation speed are set in rotation speed positions located farther away from the first area than the first upper limit and the first lower limit of the rotation speed,
a first upper limit and a first lower limit of a vibration value are set to define a most normal area as a vibration value in a critical speed, and
a second upper limit and a second lower limit of the vibration value are set in vibration value positions located farther than the first upper limit and the first lower limit of the vibration value.

7. A rotating machinery diagnosis and monitoring method using vibration values and rotation speeds which are operation data of a rotating machine, comprising the steps of:
receiving vibration values of the rotating machinery from a vibration meter;
receiving rotation speeds of the rotating machinery from a speed sensor identifying peak values of the vibration values; and
evaluating a degree of abnormality of the rotating machine from magnitude of the peak values of the vibration values and/or the rotation speeds at the peak values of the vibration values,
wherein evaluating the degree of abnormality from the rotation speeds at the peak values of the vibration values is based on an index with respect to a critical speed,
creating a two-dimensional graph in which points are plotted in a coordinate system with coordinate axes indicating the vibration values and the rotation speeds, the points being defined by the peak values and the rotation speeds corresponding to the peak values,
displaying externally the two-dimensional graph created by the computing section,
dividing the two-dimensional graph into multiple rectangular areas, each of the rectangular areas defined by a first vibration level, a second vibration level that is greater than the first vibration level, a first rotation speed and a second rotation speed that is greater than the first rotation speed,
dividing the multiple rectangular areas at least into a first area in proximity to a critical speed region of the rotating machine and a second area that exists in a position away from the first area, and
wherein, in an evaluation of a degree of abnormality by using the rotation speeds corresponding to the peak values, for any magnitudes of the vibration that give the peak values evaluating a degree of abnormality to be higher when the points defined by the peak values and the rotation speeds corresponding to the peak values are plotted in the second area than when the points defined by the peak values and the rotation speeds corresponding to the peak values are plotted in the first area.

* * * * *